(12) United States Patent
Kim

(10) Patent No.: US 9,154,849 B2
(45) Date of Patent: Oct. 6, 2015

(54) APPARATUS FOR PROVIDING MULTIMEDIA SERVICES AND METHOD THEREOF

(71) Applicant: Electronics and Telecommunications Research Institute, Daejeon (KR)

(72) Inventor: Seong Rag Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 112 days.

(21) Appl. No.: 13/722,102

(22) Filed: Dec. 20, 2012

(65) Prior Publication Data

US 2013/0227628 A1 Aug. 29, 2013

(30) Foreign Application Priority Data

| Dec. 20, 2011 | (KR) | 10-2011-0138404 |
| Aug. 10, 2012 | (KR) | 10-2012-0087792 |
| Aug. 10, 2012 | (KR) | 10-2012-0087811 |
| Nov. 19, 2012 | (KR) | 10-2012-0130780 |
| Nov. 19, 2012 | (KR) | 10-2012-0130794 |

(51) Int. Cl.
| H04B 7/02 | (2006.01) |
| H04N 21/61 | (2011.01) |
| H04L 1/00 | (2006.01) |
| H04L 1/06 | (2006.01) |
| H04L 1/08 | (2006.01) |

(52) U.S. Cl.
CPC .......... *H04N 21/6106* (2013.01); *H04L 1/0057* (2013.01); *H04L 1/0089* (2013.01); *H04L 1/06* (2013.01); *H04L 1/08* (2013.01); *H04N 21/6131* (2013.01); *H04L 2001/0093* (2013.01)

(58) Field of Classification Search
CPC ..... H04L 1/0618; H04L 1/06; H04L 25/0204; H04L 27/2647; H04L 5/0007; H04L 27/2657; H04L 27/2662; H04L 5/0048; H04B 7/0417; H04B 7/0669
USPC .......................................... 375/267, 260, 259
See application file for complete search history.

(56) References Cited

U.S. PATENT DOCUMENTS

| 6,983,243 B1 * | 1/2006 | Goyal et al. ................... 704/222 |
| 2008/0013620 A1 | 1/2008 | Hannuksela et al. |
| 2010/0027678 A1 * | 2/2010 | Alfonso ................... 375/240.21 |
| 2011/0206158 A1 * | 8/2011 | Kim et al. ..................... 375/295 |

FOREIGN PATENT DOCUMENTS

| KR | 10-2005-0065577 | 6/2005 |
| KR | 10-2011-0097680 | 8/2011 |

* cited by examiner

*Primary Examiner* — Zewdu Kassa
(74) *Attorney, Agent, or Firm* — Nelson Mullins Riley & Scarborough LLP

(57) ABSTRACT

Disclosed are a transmitter and a receiver for providing multi-layered multimedia services, and a method thereof. The transmitter for providing multimedia services includes a multiple description coding unit that performs multiple description coding (MDC) with respect to at least one source to thereby output a description sequence with respect to each of the at least one source, a description multiplexing unit that multiplexes the description sequence in units of descriptions to thereby output a single multiplexing description sequence, and a transmission code block processing unit that divides and modulates the single multiplexing description sequence to thereby generate a transmission block. Therefore, it is possible to provide high-quality multimedia services while ensuring graceful performance degradation and scalability.

5 Claims, 8 Drawing Sheets

APPARATUS FOR PROVIDING MULTIMEDIA SERVICES AND METHOD THEREOF

CLAIM FOR PRIORITY

This application claims priority to Korean Patent Application Nos. 10-2011-0138404 filed on Dec. 20, 2011, 10-2012-0087811 filed on Aug. 10, 2012, 10-2012-0087792 filed on Aug. 10, 2012, 10-2012-0130780 filed on Nov. 19, 2012, and 10-2012-0130794 filed on Nov. 19, 2012 in the Korean Intellectual Property Office (KIPO), the entire contents of which are hereby incorporated by reference.

BACKGROUND

1. Technical Field

Example embodiments of the present invention relate in general to provision of multimedia services and more specifically to a transmitter and a receiver for providing multi-layered multimedia services and a method thereof.

2. Related Art

Along with the speedup of wireless networks and the Internet, multimedia content services focusing on video are becoming more common in a broadcasting and communication convergence environment such as video streaming, mobile broadcast, or IPTV. In particular, with the advent of mobile terminals such as smart phones, demands for mobile multimedia services have been rapidly increased.

The multimedia services require provision of various types of multimedia information having different information characteristics. In addition, there are various types of terminals capable of utilizing multimedia services, and various types of service qualities capable of being implemented for each terminal.

In order to effectively cope with this diversity, service scalability is required. In addition, since a channel state continuously changes in a mobile broadcast, it is necessary to ensure graceful performance degradation in order to prevent sudden degradation of service quality.

Since a transmitter does not have information (terminal type, required service quality, channel state, or the like) about a terminal in a broadcast system, it is difficult to effectively provide multimedia services to meet the needs of users.

That is, most of the existing broadcasting systems are designed in consideration of the worst terminal. For example, in an enhanced Multimedia Multicast Broadcast Services (e-MBMS) of 3GPP, considering a case in which a reception antenna of a terminal is one, and a channel status is very bad, a QPSK modulation having the lowest transmission efficiency and a Single Input Single Output (SISO) transmission method are adopted.

However, such an approach has a problem that, although a terminal having multiple reception antennas may receive information with high transmission efficiency in a superior channel environment, high-quality multimedia services may not be achieved due to a limitation in the quantity of information to be transmitted. Therefore, for the efficient multimedia services, a transmitter should provide high-quality multimedia services and a terminal should determine service quality depending on terminal performance and channel status.

Scalable video coding (SVC) ensures scalability as leading technology, and many standard organizations have adopted SVC as a standard. SVC represents input signals as information of several layers having different information priorities.

In order to efficiently transmit such layer information having different information priorities, unequal error protection (UEP) transmission in which a degree of error protection differs depending on information priorities should be performed. Since UEP transmission should be configured by comprehensively and mutually considering a description part and a transmission part of information, the design becomes complex, and the structure and operation become complex.

A transmitter for providing high-quality multimedia services is required to transmit information at a high speed, and for this, Multiple Input Multiple Output (MIMO) technology may be suitably utilized. In order to perform transmission of information by the MIMO technology, the number of reception antennas is required to be the same as or larger than the number of transmission antennas. However, in an existing mobile broadcast, since there are many cases in which the number of reception antennas of a terminal is smaller than the number of transmission antennas of a base station, it is difficult to utilize the MIMO technology.

SUMMARY

Accordingly, example embodiments of the present invention are provided to substantially obviate one or more problems due to limitations and disadvantages of the related art.

Example embodiments of the present invention provide a transmitter and a receiver which may provide multimedia services while securing graceful performance degradation and scalability.

Example embodiments of the present invention also provide a method of providing multimedia services while securing graceful performance degradation and scalability.

In some example embodiments, a transmitter for transmitting multimedia services in an apparatus for providing multimedia services includes: a multiple description coding unit that performs multiple description coding (MDC) with respect to at least one source to thereby output a description sequence with respect to each of the at least one source; a description multiplexing unit that multiplexes the description sequence in units of descriptions to thereby output a single multiplexing description sequence; and a transmission code block processing unit that divides and modulates the single multiplexing description sequence to thereby generate a transmission block.

Here, the transmitter may further include an antenna mapping unit that performs repetition with respect to the transmission block to thereby generate a plurality of the same transmission blocks, and maps each of the transmission blocks in at least one transmission antenna.

Here, the multiple description coding unit may perform the MDC with respect to the at least one source in units of sub layers divided into a base layer and at least one enhanced layer.

Here, the transmitter may further include a systematic raptor coding unit that performs systematic raptor coding with respect to each of the description sequences output from the multiple description coding unit.

Here, the transmission code block processing unit may include a code block segmentation unit that segments each of the single multiplexing description sequences output by the description multiplexing unit into a code block, a cyclic redundancy check (CRC) attachment unit that attaches a CRC code to each of the code blocks, a channel coding unit that performs channel coding for and outputs each of the code blocks to which the CRC code is attached, and a modulation unit that modulates each of the code blocks output by the channel coding unit to thereby generate the transmission block.

Here, the transmitter may further include a pilot insertion unit that inserts a pilot signal for each of the at least one transmission antenna.

In other example embodiments, a receiver for providing multimedia services in an apparatus for providing multimedia services includes: a multiple input multiple output (MIMO) decoding unit that receives a plurality of the same transmission blocks through at least one reception antenna to thereby output, in units of the transmission blocks, a demodulation log likelihood ratio (LLR) block that is an LLR block of the transmission block; a demodulation LLR block multiplexing unit that multiplexes a prescribed number of the demodulation LLR blocks to thereby output a single demodulation LLR block; and a reception code block processing unit that performs channel decoding with respect to the single demodulation LLR block to thereby output a code block.

Here, the MIMO decoding unit may include a channel estimation unit that generates a channel estimation value using a pilot signal received through the at least one reception antenna and determines an execution order of MIMO detection, a transmission block regeneration unit that allows the single demodulation LLR block and the code block to be fed back from the demodulation LLR block multiplexing unit and the reception code block processing unit, and generates a reproduction transmission block using the single demodulation LLR block and the code block, and a MIMO detection unit that executes MIMO detection in units of the transmission blocks with reference to the channel estimation value and the reproduction transmission block to thereby output the demodulation LLR block.

Here, the reception code block processing unit may include a channel decoding unit that performs channel decoding with respect to the single demodulation LLR block to thereby generate a decode block, a CRC determination unit that receives the decode block to confirm a CRC code, and determines success or failure of reception for each of the code blocks, and a code block buffer unit that removes the CRC code from the decode block to thereby output the code block.

Here, the receiver may further include a reception description restoring unit that combines the code blocks to thereby reconstruct a description sequence; a systematic raptor decoding unit that performs systematic raptor decoding on and outputs each of the description sequence; and a multiple description decoding unit that performs multiple description decoding with respect to the description sequence output by the systematic raptor decoding unit to thereby restore at least one source.

Here, the multiple description decoding unit may perform multiple description decoding with respect to the at least one source in units of sub layers divided into a base layer and at least one enhanced layer.

In other example embodiments, a reception method for providing multimedia services in a method for providing multimedia services, includes: receiving a plurality of the same transmission blocks through at least one reception antenna to thereby output, in units of the transmission blocks, a demodulation, LLR block that is an LLR block of the transmission block; multiplexing a prescribed number of the demodulation LLR blocks to thereby output a single demodulation LLR block; and performing channel decoding with respect to the single demodulation LLR block to thereby output a code block.

When using the transmitter for providing the multimedia services according to an embodiment of the present invention, it is possible to provide high-quality multimedia services using a plurality of transmission antennas regardless of the number of antennas of the receiver.

In addition, the receiver for providing multimedia services according to an embodiment of the present invention may reflect performance of a reception terminal, power consumption, and the needs of users when the number of reception antennas is insufficient and a channel status is poor, thereby determining quality of the multimedia services.

In addition, the description part of the information may be represented as different layers depending on information priority, but the transmission part of the information may be transmitted regardless of information priority, and therefore it is possible to independently design the two parts, and to simplify the structure and the operation.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
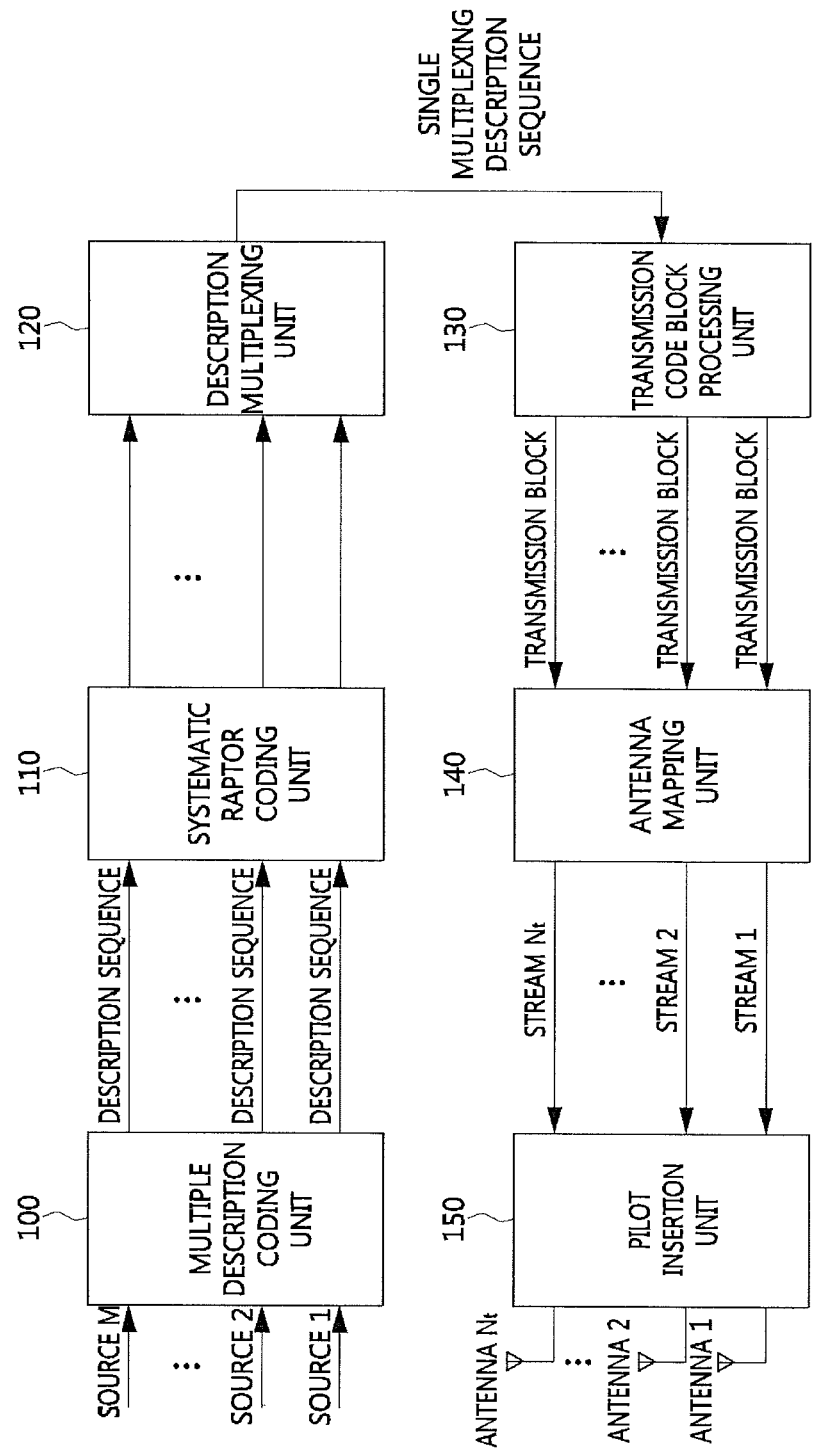
FIG. 1 is a block diagram showing a configuration of a transmitter according to an embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise" It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

The term "transmitter" used in the present application may be applied to a base station, a Node-B, eNode-B, a base transceiver system (BTS), an access point, a relay, a femto-cell, and the like. In addition, the term "receiver" used in the present application may be applied to a mobile terminal, a mobile station (MS), user equipment (UE), a user terminal (UT), a radio terminal, an access terminal (AT), a terminal, a subscriber unit, and the like.

Multiple description coding (MDC) may ensure graceful performance degradation. That is, MDC may represent one piece of information as several descriptions considering information erasure during transmission, and therefore it is possible to restore information whose quality is deteriorated even if only some of the several descriptions are received. In this case, distortion of information may be increased in proportion to the number of the erased descriptions. That is, scalable video coding (SVC) may not ensure the graceful performance degradation, and MDC does not have scalability characteristics. In order to solve this problem, scalable MDC (or layered MDC) that simultaneously ensures scalability and the graceful performance degradation has been proposed.

Scalable MDC may represent a single input signal as several layers, and each layer may represent information priority by differentiating the number of descriptions. For example, in SVC and scalable MDC, a lower-level layer has a higher information priority than an upper-level layer, and when the lower-level layer is not successfully received, the upper-level layer may not be restored.

Hereinafter, preferred embodiments of the present invention will be described in detail with reference to the accompanying drawings.

FIG. 1 is a block diagram showing a configuration of a transmitter according to an embodiment of the present invention.

Referring to FIG. 1, the transmitter according to an embodiment of the present invention includes a multiple description coding unit 100, a systematic raptor coding unit 110, a description multiplexing unit 120, a transmission code block processing unit 130, an antenna mapping unit 140, and a pilot insertion unit 150.

Hereinafter, in the following description of the present invention, the multiple description coding unit 100, the systematic raptor coding unit 110, the description multiplexing unit 120, the transmission code block processing unit 130, the antenna mapping unit 140, and the pilot insertion unit 150 are disclosed as mutually independent components, but they may be implemented as a single physical device or a single module. In addition, the multiple description coding unit 100, the systematic raptor coding unit 110, the description multiplexing unit 120, the transmission code block processing unit 130, the antenna mapping unit 140, and the pilot insertion unit 150 may be respectively implemented as a single physical device, a plurality of physical devices which are not a group, or a group.

The multiple description coding unit 100 performs multiple description coding (MDC) with respect to each of at least one source that is input to thereby output a plurality of description sequences. Multimedia services may require provision of various types of information having different characteristics. For example, such information may be information about an olfactory sense and a tactile sense as well as audio and (3D) video for reality service. Accordingly, the multiple description coding unit 100 may include at least one MDC coding block that may encode each of sources which are divided into various types of information.

For example, the number of descriptions constituting a description sequence that represents information of a single frame depending on a priority of the source may be adjusted differently. That is, information with a higher priority requires a larger number of descriptions.

Each of the MDC coding blocks may code sources about information having different characteristics. In particular, a scalable MDC coding block may perform coding with respect to the source requiring scalability due to characteristics of information. For example, the information requiring scalability may be video information, and this is because a screen with a low resolution can be restored when receiving only a base layer and a screen with a high resolution can be restored when receiving an enhanced layer as well as the base layer.

In FIG. 1, a transmitter for providing multimedia services constituted of M sources is shown.

A first source among M sources which are input to the multiple description coding unit 100 may require scalability due to information characteristics. In this case, source 1 may be input to a scalable MDC coding block.

Here, a sub layer may denote each of a base layer and at least one enhanced layer. Accordingly, the multiple description coding unit 100 may perform multiple description coding with respect to at least one source in units of sub layers that are divided into the base layer and the at least one enhanced layer.

The multiple description coding unit 100 may divide the input at least one source into a plurality of bit rows called a description. Here, the number of description sequences of a source M may be defined as $K_m$, and $K_m$ may include "1." That is, the scalable MDC coding block may be divided into a plurality of bit rows called a description in the units of sub layers to thereby perform coding.

The multiple description coding unit 100 may output a source for information with the same characteristics constituting multimedia as a plurality of coded description sequences (description data) having correlation. Through this, even when some of the plurality of coded description sequences are erased, the source may be restored despite occurrence of distortion, and therefore graceful performance degradation may occur. Here, the description sequence may be constituted of at least one description.

Therefore, the multiple description coding unit 100 according to an embodiment of the present invention may enable both the scalability and the graceful performance degradation to be implemented.

More specifically, SVC may enable scalability depending on a performance of the receiver to be implemented, and MDC may enable the graceful performance degradation due to erasure of transmitted information to be implemented.

In addition, SVC requires transmission of unequal error protection (UEP) because a priority between the base layer and the enhanced layer is different, whereas MDC does not require transmission of UEP because there is no difference in the priority between a plurality of descriptions.

Accordingly, scalable MDC may solve problems such that coverage of SVC is reduced due to the transmission of UEP, multiple input multiple output (MIMO) transmission is difficult to perform, and the number of layers is difficult to increase.

The systematic raptor coding unit 110 may perform systematic raptor coding with respect to each of the plurality of coded description sequences which are output by the multiple description coding unit 100. In addition, the systematic raptor coding may also be performed with respect to each of the coded description sequences which are output for each sub layer from the scalable MDC coding block.

That is, the systematic raptor coding unit 110 may perform coding on the description sequence so as to restore the description sequence that is erased during the transmission. In addition, the systematic raptor coding unit 110 may include at least one raptor coding block for coding each of the coded description sequences.

For example, the systematic raptor coding unit 110 may output $N_m$ pieces of data from $K_m$ coded description sequences with respect to the source M. Here, $C_m > K_m/N_m$ and $C_m > 1$ may be satisfied. The systematic raptor coding unit 110 may output the $K_m$ coded description sequences as is without change, and perform raptor coding with respect to ($N_m - K_m$) description sequences.

In other words, the systematic raptor coding performed by the systematic raptor coding unit 110 according to an embodiment of the present invention may output the $N_1$ pieces of data with respect to the $K_m$ description sequences for the source M, output ($N_m - K_m$) raptor coded description sequences, and output the $K_m$ description sequences as is.

That is, the systematic raptor coding unit 110 may output a plurality of description sequences as is, and add and output a prescribed number of raptor coded description sequences.

Therefore, the transmitter according to an embodiment of the present invention may perform systematic raptor coding in order to reduce delay and power consumption due to raptor decoding in the receiver. In addition, the transmitter may adjust $N_m$ depending on source priority. However, there is no particular limitation in an upper limit of $N_m$, but since an amount of data to be transmitted is increased along with an increase in $N_m$, the limitation in the upper limit of $N_m$ may be required.

In addition, according to an embodiment of the present invention, the systematic raptor coding may be selectively applied, and may not be an essential configuration.

The description multiplexing unit 120 may multiplex the description sequence in units of descriptions to thereby output a single multiplexing description sequence. Here, the single multiplexing description sequence may denote one description sequence generated by the multiplexing in the units of descriptions.

That is, the description multiplexing unit 120 may multiplex a plurality of description sequences in units of descriptions to thereby generate one description sequence.

Figure 2:
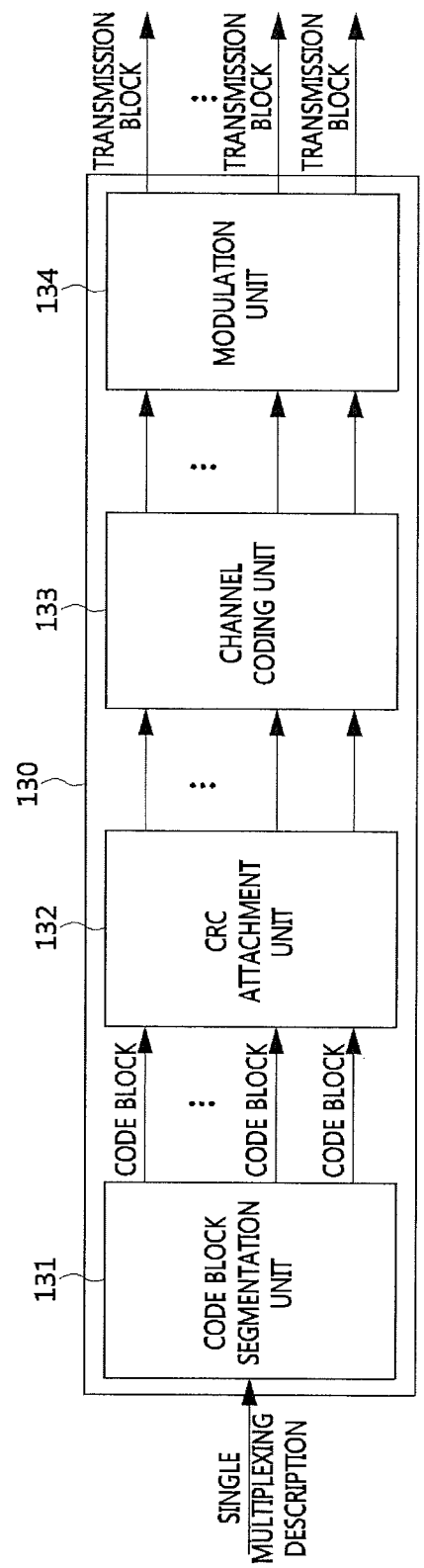
FIG. 2 is a block diagram showing a more detailed configuration of a transmission code block processing unit shown in FIG. 1.

FIG. 2 is a block diagram showing a more detailed configuration of a transmission code block processing unit 130 shown in FIG. 1.

Referring to FIG. 2, the transmission code block processing unit 130 includes a code block segmentation unit 131, a CRC attachment unit 132, a channel coding unit 133, and a modulation unit 134. The transmission code block processing unit 130 may divide and modulate the single multiplexing description sequence to thereby generate a transmission block. The transmission code block processing unit 130 may divide the single multiplexing description sequence into code blocks, and process the code block so that the receiver may confirm failure or success of transmission for each code block and correct a transmission error.

In addition, the transmission code block processing unit 130 may perform modulation for each code block to thereby output a transmission block. That is, the transmission code block processing unit 130 may divide and modulate the single multiplexing description sequence output from the description multiplexing unit 120 to thereby output the transmission block.

The code block segmentation unit 131 may segment the single multiplexing description sequence output by the description multiplexing unit 120 into code blocks considering a code rate and an order of modulation. That is, the code block segmentation unit 131 may segment the single multiplexing description sequence into a plurality of code blocks that are a smaller unit than that of the single multiplexing description sequence.

The CRC attachment unit 132 may attach a CRC code to the code block. Here, the CRC may denote a method of using a cyclic binary code in order to detect errors generated in a process of transmitting data.

That is, when a transmission side segments data in units of blocks, adds, behind each block, the cyclic code obtained by a specific calculation of a binary polynomial as an extra, and transmits the block, a reception side may confirm failure or success of transmission based on whether the same cyclic code is obtained by the same calculation.

Accordingly, the CRC attachment unit 132 may allow the receiver to determine failure or success of the transmission with respect to each code block.

The channel coding unit 133 may perform channel coding for and output each code block to which the CRC code is attached. In particular, the channel coding unit 133 may perform coding on the code block so as to detect or correct an error occurring in the process of transmitting data. For example, the channel coding unit 133 may use a Forward Error Correction method.

The modulation unit 134 may modulate the code block output by the channel coding unit 133 and generate a single symbol, thereby outputting a transmission block. The modulation unit 134 may modulate Q coded bits of the code block which are consecutive for each code block and generate the single symbol, thereby outputting the transmission block. Here, Q denotes a modulation order. For example, in QPSK, a value of Q may be "2," and in 16QAM, a value of Q may be "4," That is, the modulation unit 134 may transmit the single symbol instead of the Q bits to thereby improve frequency use efficiency (spectral efficiency, bits/Hz). Here, the frequency use efficiency may be increased along with an increase in the value of Q.

Figure 3:
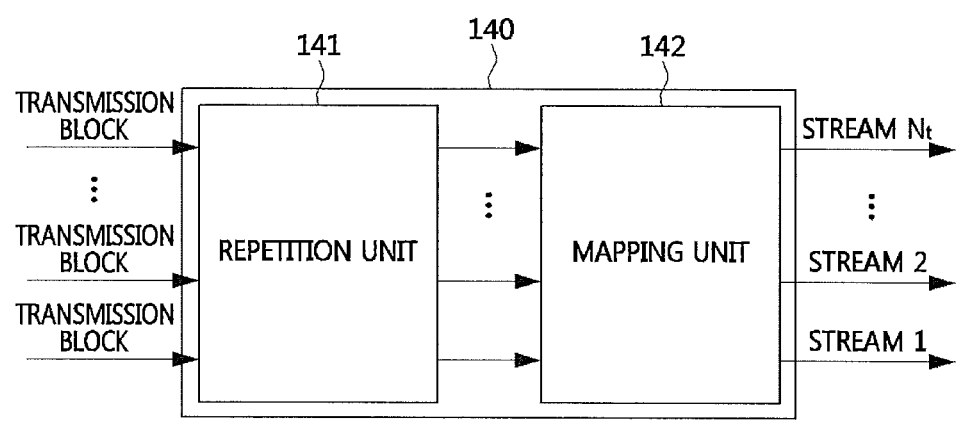
FIG. 3 is a block diagram showing a more detailed configuration of an antenna mapping unit shown in FIG. 1.

FIG. 3 is a block diagram showing a more detailed configuration of an antenna mapping unit 140 shown in FIG. 1.

Referring to FIG. 3, the antenna mapping unit 140 includes a repetition unit 141 and a mapping unit 142. The antenna mapping unit 140 may perform repetition with respect to a transmission block to thereby generate a plurality of the same transmission blocks, and map each of the transmission blocks in a transmission antenna.

For example, the antenna mapping unit 140 may map the transmission block in $N_t$ transmission antennas to thereby output $N_t$ streams.

The repetition unit 141 may generate the plurality of the same transmission blocks by performing repetition with respect to the transmission block, and the mapping unit 142 may map each of the transmission blocks in at least one transmission antenna.

For example, the repetition unit 141 may perform a predetermined number ($R_m$) of repetitions for each transmission block output from the transmission code block processing unit 130 to thereby output the same number of transmission blocks as the predetermined number of repetitions. The predetermined number of repetitions that is $R_m$ may be performed, and therefore $R_m$ transmission blocks may be output. Accordingly, when successfully receiving even a single transmission block among the $R_m$ same transmission blocks, the repetition unit 141 may restore a corresponding description sequence. In addition, in order to ensure stable reception performance, it is preferable that the $R_m$ same transmission blocks be transmitted using an independent path or resource (time, frequency, antenna, or the like).

The mapping unit 142 may perform one-to-one antenna mapping. In addition, the mapping unit 142 may enable transmission blocks with respect to a single description sequence to be transmitted using wireless resources (time or frequency) having the same characteristics through the same transmission antenna so as to have characteristics of an erasure channel in units of description sequences. Here, when a transmitted packet (code block or description sequence) is erased due to noise, interference, congestion, system failure, or the like during the transmission, the transmitted packet may be regarded as an erasure channel.

In addition, the transmitter according to an embodiment of the present invention may further include a pilot insertion unit 150. The pilot insertion unit 150 may insert a pilot signal for each transmission antenna so that the receiver may estimate a MIMO channel.

Figure 4:
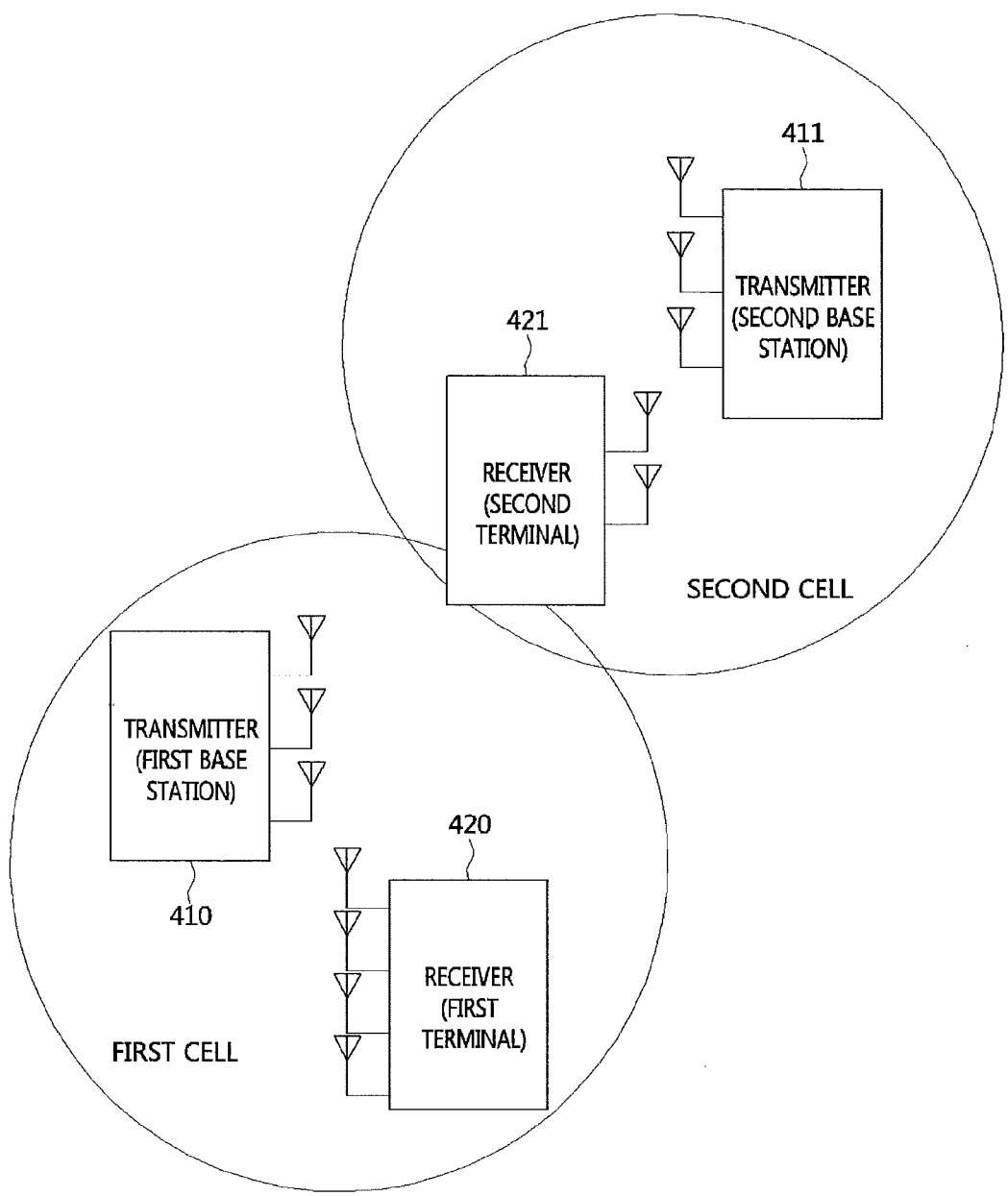
FIG. 4 is a conceptual diagram showing an operating environment of a transmitter and a receiver according to an embodiment of the present invention.

FIG. 4 is a conceptual diagram showing an operating environment of a transmitter and a receiver according to an embodiment of the present invention.

Referring to FIG. 4, a first base station 410 and a second base station may transmit signals through three transmission antennas. Here, each of the first base station 410 and the second base station 411 may be the transmitter according to an embodiment of the present invention. A first cell may be formed by the first base station 410, and a second cell may be formed by the second base station 411.

The two base stations may transmit mutually independent signals, or the same signals in cooperation. In a case of cooperative broadcast, each base station may perform the same transmission function in order to generate the same transmission signal.

The first terminal 420 may be involved in the first cell and receive signals of the first base station 410, and signals of the second base station 411 may be regarded as noise. The second terminal 421 may be in the middle between the first cell and the second cell, but slightly closer to the second base station 411. Therefore, when the two base stations transmit mutually independent signals, the signals of the second base station 411 may be received, and the signals of the first base station 410 may be regarded as noise.

In addition, when the two base stations perform cooperative broadcast of transmitting the same signals, the two signals are subjected to coherent combining, thereby improving reception efficiency.

Here, the number of transmission antennas of the base station may be the same, but the number of reception antennas of each terminal may be different. The first terminal 420 of which the number of reception antennas is 4 and the second terminal 421 of which the number of reception antennas is 2 may receive signals transmitted from the base station having three transmission antennas. Obviously, the reception efficiency may be reduced along with a reduction in the number of reception antennas.

Figure 5:
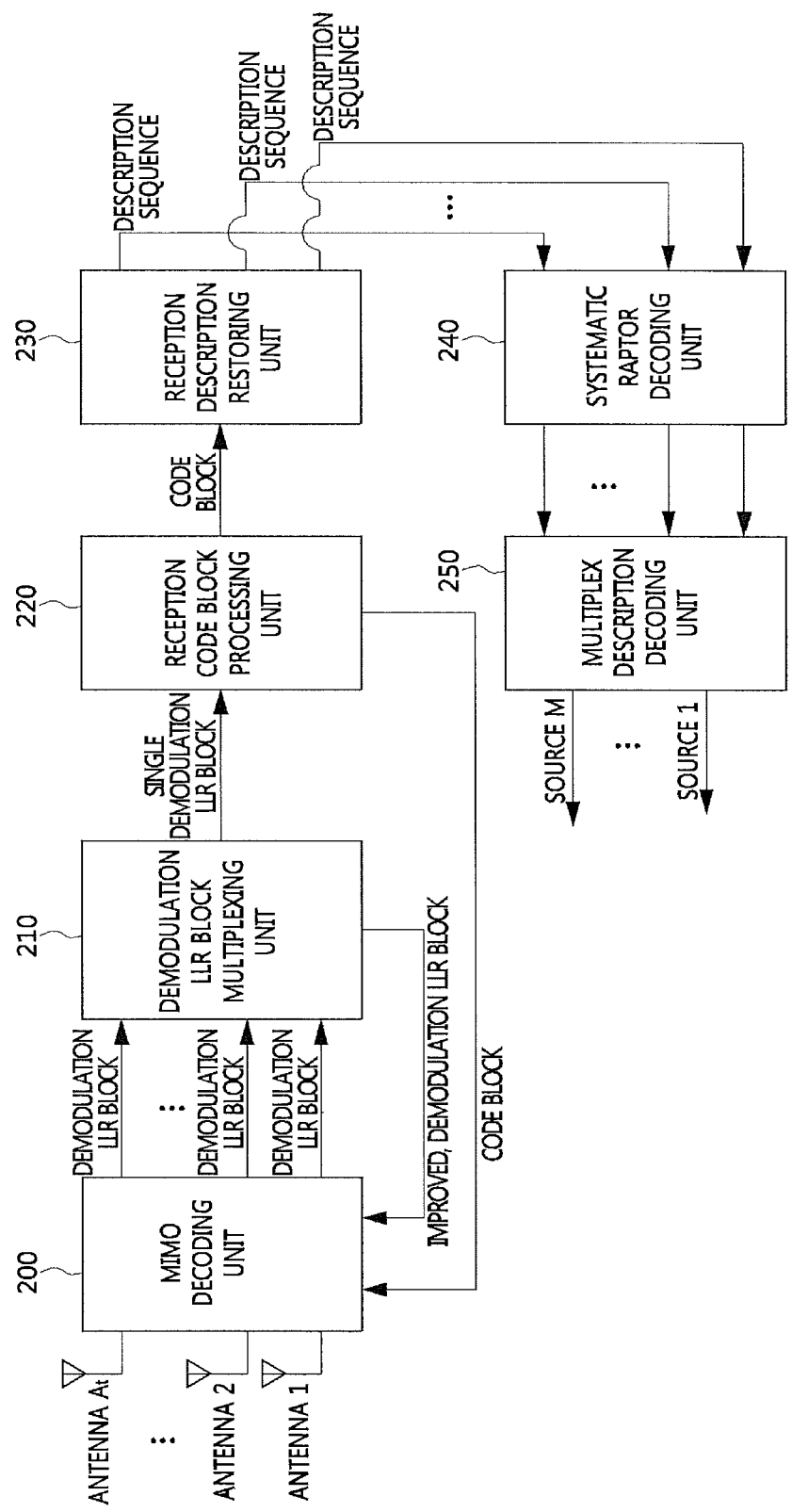
FIG. 5 is a block diagram showing a configuration of a receiver according to an embodiment of the present invention.

FIG. 5 is a block diagram showing a configuration of a receiver according to an embodiment of the present invention.

Referring to FIG. 5, the receiver according to an embodiment of the present invention includes a MIMO decoding unit 200, a demodulation log likelihood ratio (LLR) block multiplexing unit 210, a reception code block processing unit 220, a reception description restoring unit 230, a systematic raptor decoding unit 240, and a multiple description decoding unit 250.

Hereinafter, in the following description of the present invention, the MIMO decoding unit 200, the demodulation LLR block multiplexing unit 210, the reception code block processing unit 220, the reception description restoring unit 230, the systematic raptor decoding unit 240, and the multiple description decoding unit 250 are disclosed as mutually independent components, but they may be implemented as a single physical device or a single module. In addition, the MIMO decoding unit 200, the demodulation LLR block multiplexing unit 210, the reception code block processing unit 220, the reception description restoring unit 230, the systematic raptor decoding unit 240, and the multiple description decoding unit 250 may be respectively implemented as a single physical device, a plurality of physical devices which are not a group, or a group.

The receiver according to an embodiment of the present invention may receive signals in units of transmission blocks, and perform decoding or the like on the reception signals to thereby restore information. Here, the receiver may have $A_r$ reception antennas. That is, the transmitter may transmit signals which are mapped in a transmission antenna in units of transmission blocks, and the receiver may receive the transmitted signals through a reception antenna.

The MIMO decoding unit 200 may receive a plurality of the same transmission blocks through at least one reception antenna to thereby output a demodulation LLR block that is an LLR block of the transmission block in units of transmission blocks.

The demodulation LLR block multiplexing unit 210 may multiplex a prescribed number of demodulation LLR blocks to thereby output a single demodulation LLR block. Here, the single demodulation LLR block may denote one demodulation LLR block generated by multiplexing the prescribed number of demodulation LLR blocks. In addition, the demodulation LLR block multiplexing unit 210 may feed the output single demodulation LLR block back to the MIMO decoding unit 200. Here, the prescribed number may be determined to correspond to the number of transmission antennas.

The reception code block processing unit 220 may perform channel decoding with respect to the single demodulation LLR block to thereby output the code block. In addition, the reception code block processing unit 220 may feed the output code block back to the MIMO decoding unit 200.

The reception description restoring unit 230 may reconstruct the description sequence by combining the code blocks, and the systematic raptor decoding unit 240 may perform systematic raptor decoding on and output each of the description sequences.

In addition, the multiple description decoding unit 250 may perform multiple description decoding with respect to the description sequence output by the systematic raptor decoding unit 240 to thereby restore at least one source.

Figure 6:
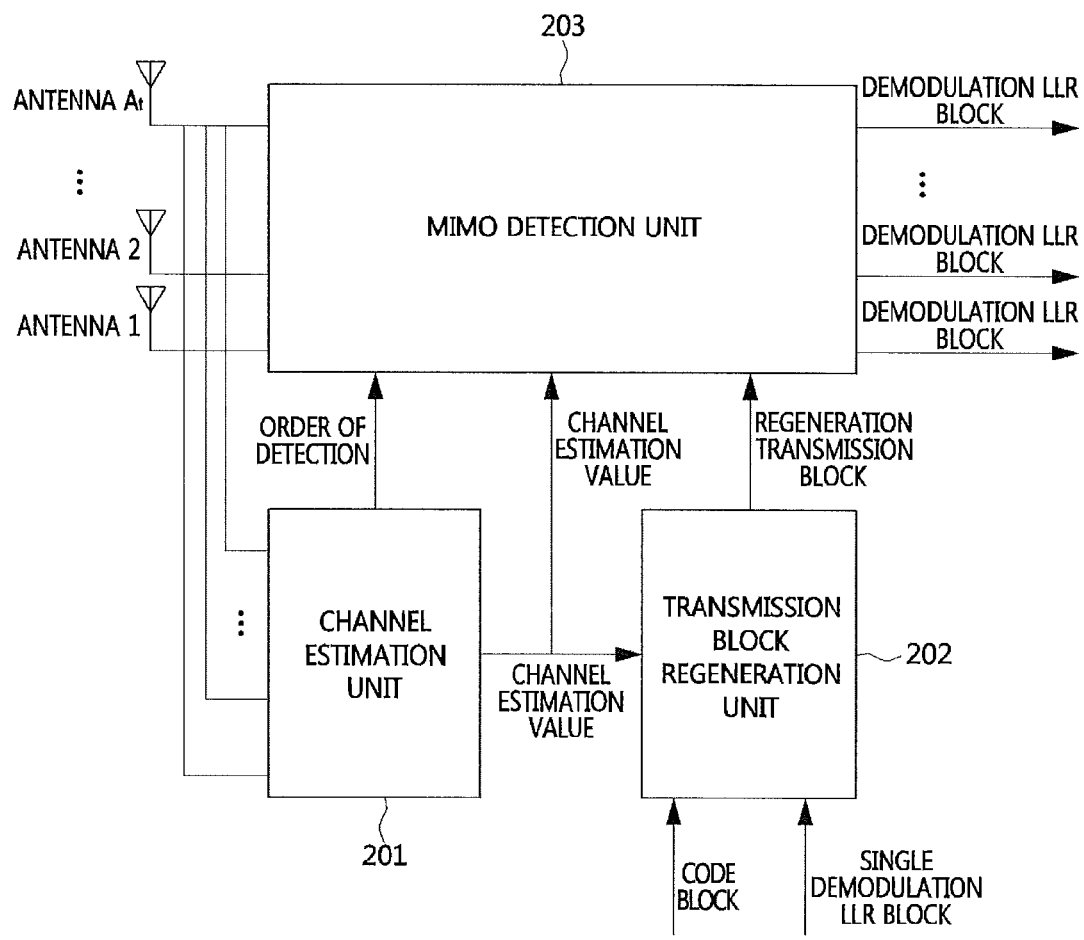
FIG. 6 is a block diagram showing a more detailed configuration of a MIMO decoding unit shown in FIG. 5.

FIG. 6 is a block diagram showing a more detailed configuration of the MIMO decoding unit shown in FIG. 5.

Referring to FIGS. 5 and 6, the MIMO decoding unit 200 may receive a plurality of the same transmission blocks through $A_r$ reception antennas to thereby output a demodulation LLR block that is an LLR block of the transmission block in units of transmission blocks.

That is, the MIMO decoding unit 200 may receive reception signals through at least one reception antenna in units of transmission blocks, and output an LLR block for each transmission block. Accordingly, the MIMO decoding unit 200 may output the LLR block in units of transmission blocks, and transmit the output LLR block to the demodulation LLR block multiplexing unit 210 which will be described later.

The MIMO decoding unit 200 includes a channel estimation unit 201, a transmission block regeneration unit 202, and a MIMO detection unit 203.

The channel estimation unit 201 may generate a channel estimation value using a pilot signal received through at least one reception antenna and determine an execution order of MIMO detection. That is, the channel estimation unit 201 may calculate a MIMO channel estimation value in units of transmission blocks using the pilot signal of the reception signal received through the at least one reception antenna.

In addition, the channel estimation unit 201 may determine the execution order of the MIMO detection. For example, the channel estimation unit 201 may determine an order to perform the MIMO detection considering a channel status, a code rate, and an order of modulation.

The transmission block regeneration unit 202 may allow the single demodulation LLR block and the code block to be fed back, and regenerate the transmission block using the single demodulation LLR block and the code block. That is, the transmission block regeneration unit 202 may regenerate the transmission block using the single demodulation LLR block that is an output of the demodulation LLR block multiplexing unit 210 and the code block that is an output of the reception code block processing unit 220.

For example, the transmission block regeneration unit 202 may regenerate the transmission block using the fed back code block, the channel estimation value, and the channel coding, modulation, or the like which are used to generate a corresponding transmission block in a transmission side.

In addition, the transmission block regeneration unit 202 may perform hard decision with respect to the fed back single demodulation LLR block, and regenerate the transmission block using the channel estimation value and the modulation that is used to generate a corresponding transmission block in the transmission side.

The MIMO detection unit 203 may output the demodulation LLR block through the MIMO detection with reference to the regenerated transmission block in units of transmission blocks.

The MIMO detection may be performed in units of transmission blocks, and a MIMO detection method may be determined in accordance with a type of the output by the transmission block regeneration unit 202.

Hereinafter, a method of detecting MIMO of a first transmission block in a specific transmission block interval will be described.

In the case of non-cooperative broadcast, in reception signals in accordance with the specific transmission block interval, $N_t$ transmission blocks transmitted from a transmission side may overlap. In the MIMO detection with respect to the first transmission block, the remaining $(N_t-1)$ transmission blocks excluding a corresponding transmission block may be regarded as interference, and minimum mean-square-error (MMSE) estimation may be performed to output the demodulation LLR block.

When the output demodulated LLR block passes through the demodulation LLR block multiplexing unit 210 and the reception code block processing unit 220 and then success of reception with respect to the first transmission block is confirmed, MIMO detection with respect to a second transmission block may be performed.

In addition, when failure of reception is confirmed, MIMO detection with respect to the remaining transmission blocks may be stopped, and a bit with respect to a demodulation LLR block of the corresponding transmission block may be replaced with "0."

The transmission block regeneration unit 202 may regenerate the first transmission block using the first code block that has been successfully received. The MIMO detection with respect to the second transmission block may be performed after removing the regenerated first transmission block and performing MMSE estimation, thereby outputting the demodulation LLR block.

In addition, reception signals in which the first transmission block is removed may be stored. When success of reception with respect to the second transmission block is confirmed, MIMO detection with respect to a third transmission block may be performed.

Accordingly, in MIMO detection with respect to an $n^{th}$ transmission block, reception signals in which (n−2) transmission blocks are previously removed are stored in advance, and an $(n-1)^{th}$ transmission block may be regenerated using an $(n-1)^{th}$ code block that has just been received.

That is, MIMO detection with respect to the $n^{th}$ transmission block may be performed after removing, from the reception signals in which (n−2) transmission blocks stored in advance are removed, the $(n-1)^{th}$ transmission block that is presently regenerated and then performing MMSE estimation. This process is performed sequentially, and MIMO detection with respect to $N_t$ transmission blocks may be performed.

Next, MIMO detection using the single demodulation LLR block will be described.

The MIMO detection using the single demodulation LLR block may be similar to MIMO detection using the code block, but the differences may be as follows.

In the MIMO detection using the single demodulation LLR block, since regeneration is performed before channel coding, whether the transmission block is received successfully may not be confirmed.

Accordingly, a process of confirming whether a current transmission block is received successfully in a previous transmission block interval is not performed. In addition, since whether the transmission block on which MIMO detection is currently performed is received successfully cannot be confirmed, the MIMO detection cannot be interrupted in the middle of performing the MIMO detection, and the MIMO detection may be performed without interruption with respect to $N_t$ of the transmission blocks of a specific transmission block interval.

In addition, in the case of cooperative broadcast of a plurality of base stations, since the transmission blocks overlap in the plurality of base stations, interference of transmission signals of all of the base stations may be removed from the reception signals of a specific transmission block interval using an output of regeneration for the transmission block with respect to each of the base stations. Coherent combining using an output of a channel estimation value with respect to each base station may be performed on the reception signals from which interference is removed, thereby generating signals with an improved Signal to Noise Ratio (SNR).

Figure 7:
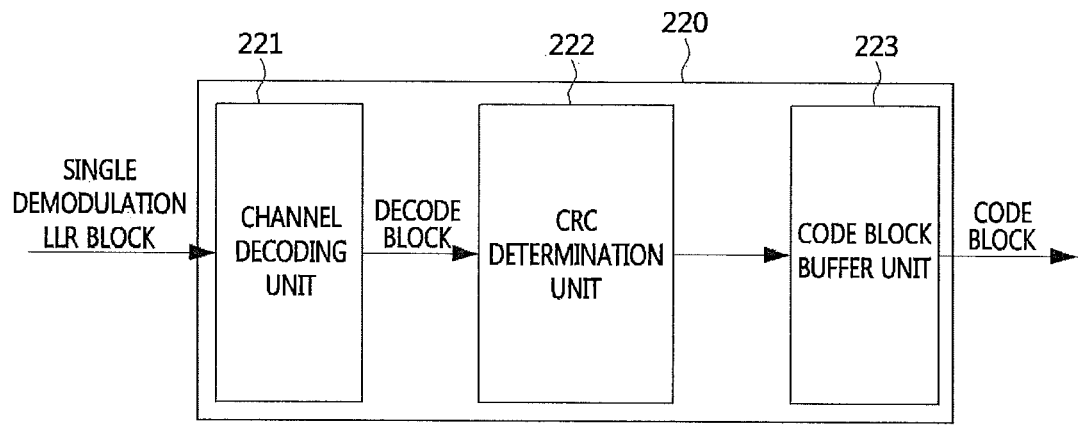
FIG. 7 is a block diagram showing a more detailed configuration of a reception code block processing unit shown in FIG. 5.

FIG. 7 is a block diagram showing a more detailed configuration of a reception code block processing unit 220 shown in FIG. 5.

Referring to FIG. 7, the reception code block processing unit 220 includes a channel decoding unit 221, a CRC determination unit 222, and a code block buffer unit 233.

The reception code block processing unit 220 may output a code block for each transmission block. In addition, the reception code block processing unit 220 may correct a transmission error, and determine success or failure of transmission for each code block.

The channel decoding unit 221 may perform channel decoding with respect to a single demodulation LLR block to thereby generate a decode block. That is, the channel decoding unit 221 may perform forward error correction using the single demodulation LLR block. Accordingly, the channel decoding unit 221 may generate a decode block determined through the forward error correction.

The CRC determination unit 222 may receive the decode block to check a CRC code, and determine failure or success of reception for each of the code blocks.

The code block buffer unit 223 may remove the CRC code from the decode block to thereby output and store the code block, and feed the code block back to the MIMO decoding unit 200.

Referring again to FIG. 5, the reception description restoring unit 230 may reconstruct the description sequence using the code block. When reception with respect to the code blocks constituting a single description sequence is completed, the reception description restoring unit 220 may reconstruct the description sequence using this. Here, when an error is detected in any one of the received code blocks, the reception description restoring unit 220 may output a corresponding description to be reconstructed as an erased description. The erased description may not be directly utilized in restoring the transmission description, but may indicate information about which description is erased.

The systematic raptor decoding unit 240 may perform systematic raptor decoding for each description sequence. That is, when all of the description sequences on which raptor coding has not been performed are received successfully, the systematic raptor decoding unit 240 may not perform raptor decoding, and when an erased description sequence among the description sequences on which the raptor coding has not been performed is present, the systematic raptor decoding unit 240 may perform raptor decoding of sequentially adding the description sequence on which the raptor coding has been performed, thereby restoring the erased description sequence. Accordingly, the systematic raptor decoding unit 240 may determine whether the description sequence transmitted from the transmitter is erased.

For example, in a case of the source M, whether $K_m$ description sequences are erased may be determined. When the $K_m$ description sequences are all erased successfully, the $K_m$ description sequences may be output with no change, thereby reducing time delay and power consumption due to decoding. In addition, when the erased description sequence is present among the $K_m$ transmitted descriptions, raptor decoding may be performed by adding the description sequence on which the raptor coding has been performed. Here, until the $K_m$ description sequences are decoded successfully, the raptor decoding may be performed by adding the description sequence on which the raptor coding has been performed. In addition, the systematic raptor decoding unit 240 may include at least one raptor decoding block capable of performing the raptor decoding for each description sequence.

The receiver according to an embodiment of the present invention may further include a multiple description decoding unit 250 that decodes the description sequence output by the systematic raptor decoding unit 240 to thereby restore at least one source. That is, the multiple description decoding unit 250 may decode (MDC decoding) the description sequence coded by the multiple description coding unit 100 of the transmitter to thereby restore the source. In addition, in the case of the description sequence that is coded in units of sub layers by the scalable MDC coding block of the transmitter, a restoration description of an upper-level layer may be finally restored using a restoration description of a lower-level layer. That is, the multiple description decoding unit 250 may perform multiple description decoding with respect to at least one source in units of sub layers that are constituted of a base layer and at least one enhanced layer. Accordingly, the multiple description decoding unit 250 may include at least one MDC decoding block capable of decoding each of the sources segmented into various types of information, and include a scalable MDC decoding block capable of decoding a description in units of sub layers.

Figure 8:
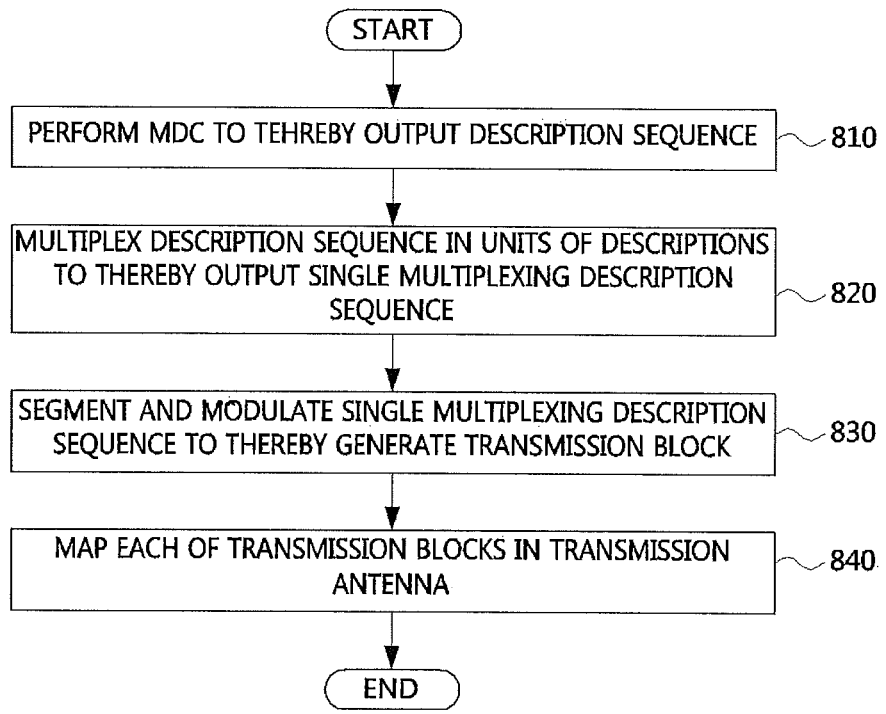
FIG. 8 is a flowchart showing a transmission method according to an embodiment of the present invention.

FIG. 8 is a flowchart showing a transmission method according to an embodiment of the present invention.

The transmission method for providing multimedia services according to an embodiment of the present invention may perform multiple description coding with respect to at least one source, and redundantly transmit a description by utilizing a variety of channel coding methods, and therefore broadcasting MIMO transmission may be performed while having characteristics of graceful performance degradation.

Referring to FIG. 8, the transmission method according to an embodiment of the present invention includes performing multiple description coding (MDC) to thereby output a description sequence in step S810, multiplexing the description sequence in units of descriptions to thereby output a single multiplexing description sequence in step S820, generating transmission blocks in step S830, and mapping each of the transmission blocks in a transmission antenna in step S840.

In step S810, the transmission method may include performing MDC with respect to at least one source to thereby output a description sequence with respect to each of the at least one source.

In addition, in step S810, the transmission method may include performing MDC with respect to the at least one source in units of sub layers divided into a base layer and at least one enhanced layer.

In step S820, the transmission method may include multiplexing the description sequence in units of descriptions to thereby output a single multiplexing description sequence.

In step S830, the transmission method may include segmenting the single multiplexing description sequence into code blocks, attaching a CRC code to each of the code blocks, and performing channel coding for each of the code blocks to which the CRC code is attached to thereby output the code block. The transmission method may include modulating each of the code blocks which are output by performing the channel coding, thereby generating a transmission block.

In step S840, the transmission method may include performing repetition with respect to the transmission block to thereby generate a plurality of the same transmission blocks, and mapping each of the transmission blocks in at least one transmission antenna.

In addition, the transmission method may include inserting a pilot signal for each of the at least one transmission antenna.

In addition, the transmission method according to an embodiment of the present invention may further include performing systematic raptor coding with respect to each of the output description sequence.

Figure 9:
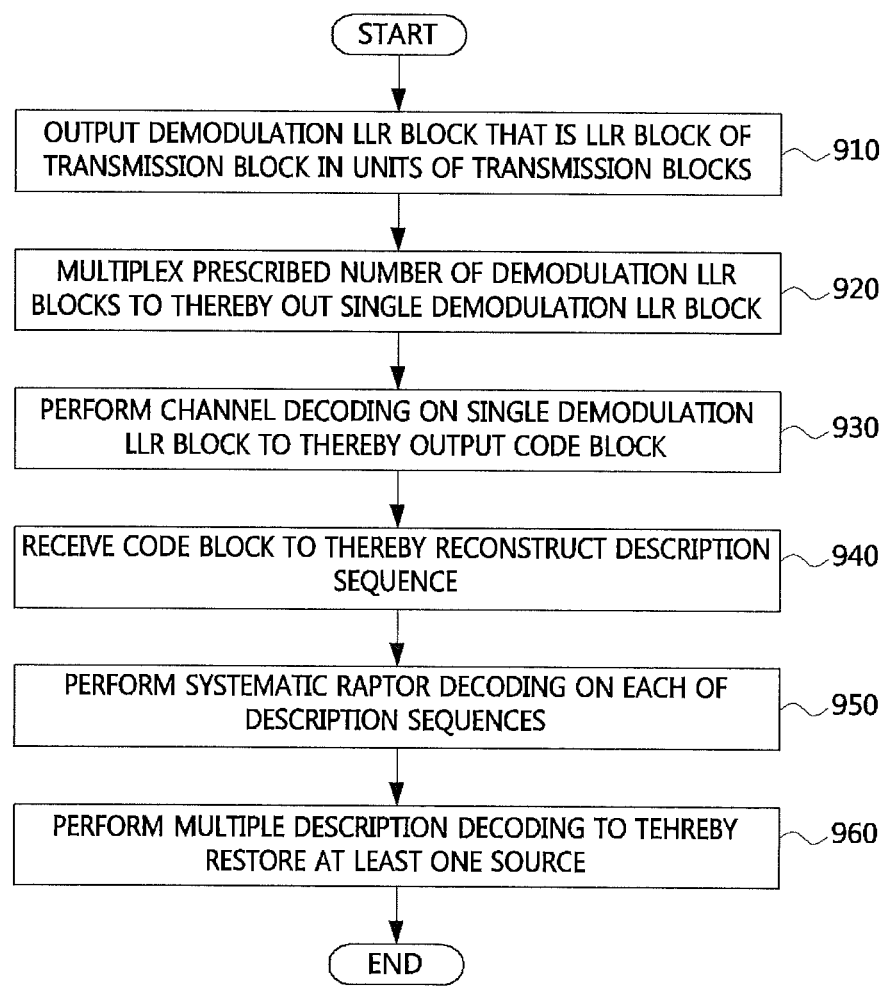
FIG. 9 is a flowchart showing a reception method according to an embodiment of the present invention.

FIG. 9 is a flowchart showing a reception method according to an embodiment of the present invention.

The reception method for providing multimedia services according to an embodiment of the present invention includes outputting a demodulation LLR block in step S910, outputting a single demodulation LLR block in step S920, outputting a code block in step S930, receiving the code block to thereby reconstruct the description sequence in step S940, performing systematic raptor decoding in step S950, and performing multiple description decoding in step S960.

In step S910, the reception method may include receiving a plurality of the same transmission blocks through at least one reception antenna, and outputting a demodulation LLR block that is an LLR block of the transmission block, in the units of transmission blocks.

More specifically, in step S910, the reception method may include generating a channel estimation value using the pilot signal received through the at least one reception antenna, determining an execution order of MIMO detection, allowing the single demodulation LLR block and the code block to be fed back, and generating a regeneration transmission block using the single demodulation LLR block and the code block. Therefore, the reception method may include outputting the demodulation LLR block through MIMO detection with reference to the channel estimation value and the regeneration transmission block.

In step S920, the reception method may include multiplexing a prescribed number of the demodulation LLR blocks to thereby output the single demodulation LLR block.

In step S930, the reception method may include performing channel decoding with respect to the single demodulation LLR block to thereby generate a code block.

More specifically, in step S930, the reception method may include performing channel decoding with respect to the single demodulation LLR block to thereby generate a decode block, receiving the decode block to check a CRC code, and confirming failure or success of reception for each of the code blocks. Therefore, the reception method may include removing the CRC code from the decode block to thereby output the code block.

In step S940, the reception method may include receiving the code block to thereby reconstruct the description sequence. That is, the reception method may include restoring the description sequence by combining the code blocks.

In step S950, the reception method may include performing systematic raptor decoding on and outputting each of the description sequences to thereby output.

In step S960, the reception method may include performing multiple description decoding with respect to the description sequence output by performing the systematic raptor decoding, thereby restoring at least one source. In step S960, the reception method may include performing multiple description decoding with respect to at least one source in units of sub layers divided into a base layer and at least one enhanced layer.

The transmission method and the reception method are methods performed by the transmitter and the receiver according to the embodiments of the present invention, and can be understood more clearly with reference to the above-described transmitter and receiver.

As described above, the transmitter according to the embodiments of the present invention may redundantly transmit mutually different description sequences using a large number of antennas, and the receiver may receive signals so as to fit its ability and a channel status.

For example, a terminal in which the number of reception antennas is large and the channel status is superior may receive all of the description sequences to thereby restore high-quality signals, and a terminal in which the number of reception antennas is small and the channel status is poor can not receive some of the transmitted description sequences to thereby restore signals with degraded quality.

In addition, a description part and a transmission part of data are designed separately, thereby simplifying a structure of each of the transmitter and the receiver.

In the present specification, the transmitter may transmit data to a large number of transmission antennas, and there is no limitation on the number of the antennas of the receiver, and therefore this method may be referred to as Multi Input Variable Output (MIVO) broadcasting.

While the example embodiments of the present invention and their advantages have been described in detail, it should be understood that various changes, substitutions and alterations may be made herein without departing from the scope of the invention.

What is claimed is:

1. A transmitter for transmitting multimedia services in an apparatus for providing multimedia services, the transmitter comprising: a multiple description coding unit that performs multiple description coding (MDC) with respect to at least one source to thereby output a description sequence with respect to each of the at least one source; a description multiplexing unit that multiplexes the description sequence in units of descriptions to thereby output a single multiplexing description sequence; a transmission code block processing unit that divides and modulates the single multiplexing description sequence to thereby generate a transmission block; and further comprising: an antenna mapping unit that performs repetition with respect to the transmission block to thereby generate a plurality of the same transmission blocks, and maps each of the transmission blocks in at least one transmission antenna.

2. The transmitter of claim 1, further comprising: a systematic raptor coding unit that performs systematic raptor coding with respect to each of the description sequences output from the multiple description coding unit.

3. The transmitter of claim 1, further comprising: a pilot insertion unit that inserts a pilot signal for each of the at least one transmission antenna.

4. A transmitter for transmitting multimedia services in an apparatus for providing multimedia services, the transmitter comprising: a multiple description coding unit that performs multiple description coding (MDC) with respect to at least one source to thereby output a description sequence with respect to each of the at least one source; a description multiplexing unit that multiplexes the description sequence in units of descriptions to thereby output a single multiplexing description sequence; a transmission code block processing unit that divides and modulates the single multiplexing description sequence to thereby generate a transmission block; and wherein the multiple description coding unit performs the MDC with respect to the at least one source in units of sub layers divided into a base layer and at least one enhanced layer.

5. A transmitter for transmitting multimedia services in an apparatus for providing multimedia services, the transmitter comprising: a multiple description coding unit that performs multiple description coding (MDC) with respect to at least one source to thereby output a description sequence with respect to each of the at least one source; a description multiplexing unit that multiplexes the description sequence in units of descriptions to thereby output a single multiplexing description sequence; a transmission code block processing unit that divides and modulates the single multiplexing description sequence to thereby generate a transmission block; and wherein the transmission code block processing unit includes a code block segmentation unit that segments each of the single multiplexing description sequences output by the description multiplexing unit into a code block, a cyclic redundancy check (CRC) attachment unit that attaches a CRC code to each of the code blocks a channel coding unit that performs channel coding for and outputs each of the code blocks to which the CRC code is attached, and a modulation unit that modulates each of the code blocks output by the channel coding unit to thereby generate the transmission block.

* * * * *